United States Patent [19]

Herzog et al.

[11] Patent Number: 5,058,288
[45] Date of Patent: Oct. 22, 1991

[54] PLUMB BOB DEVICE FOR DETERMINING THE BED HEIGHT OF BULK MATERIAL IN A SHAFT FURNACE

[75] Inventors: Ingo Herzog, Schermbeck; Bruno Kammerling, Dinslaken, both of Fed. Rep. of Germany

[73] Assignee: Man Gutehoffnungshutte Aktiengesellschaft, Oberhausen, Fed. Rep. of Germany

[21] Appl. No.: 687,441

[22] Filed: Apr. 18, 1991

[30] Foreign Application Priority Data

Apr. 21, 1990 [DE] Fed. Rep. of Germany ....... 4012816

[51] Int. Cl.⁵ .............................. G01F 23/04
[52] U.S. Cl. ...................... 33/720; 33/715; 33/716
[58] Field of Search ................. 33/713–721; 73/321, 312, 309

[56] References Cited

U.S. PATENT DOCUMENTS

| | | | |
|---|---|---|---|
| 3,500,546 | 3/1970 | Pilcher | 33/715 |
| 3,742,307 | 6/1973 | Patsch et al. | 33/720 X |
| 4,255,859 | 3/1981 | Klieman | 33/715 |

Primary Examiner—Harry N. Haroian
Attorney, Agent, or Firm—McGlew & Tuttle

[57] ABSTRACT

The present invention pertains to a plumb bob device for determining the bed height of bulk material in a shaft furnace. The winding drum 1 for unwidning and rewinding a cable 5 or a chain with a plumb bob 6 suspended at its end is driven by a hydraulic motor 3. A displacement transducer 9 is driven by the shaft of the winding drum 1. The motor for driving the winding drum 1 is a so-called low-speed hydraulic motor 3. The displacement transducer 9 sends a signal associated with the actual measured depth to a pressure-proportional valve 10 directly, i.e., without an electrical control device. This valve presets a plumb bob holding pressure associated with the actual depth for the hydraulic motor 3.

2 Claims, 1 Drawing Sheet

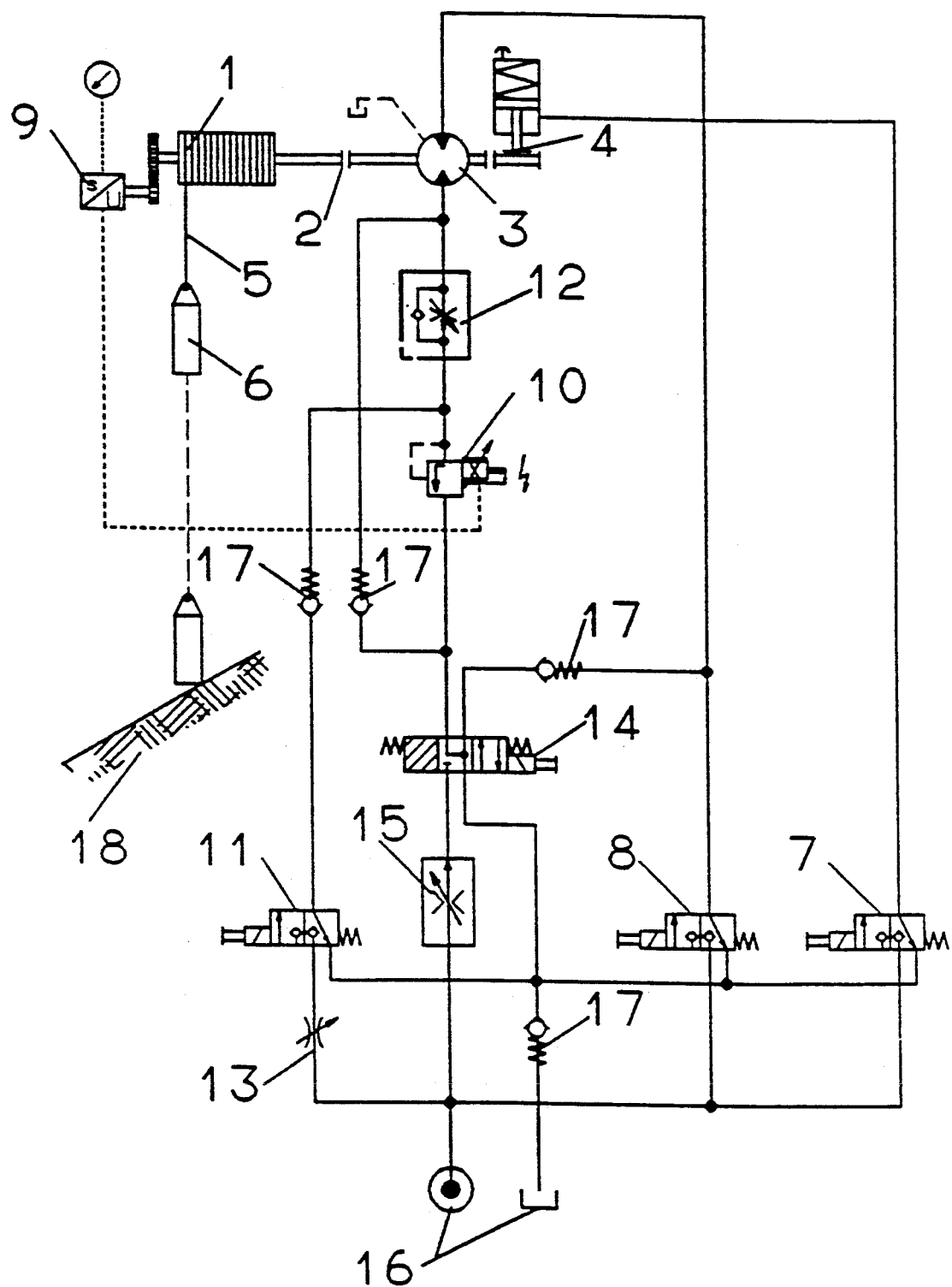

PLUMB BOB DEVICE FOR DETERMINING THE BED HEIGHT OF BULK MATERIAL IN A SHAFT FURNACE

FIELD OF THE INVENTION

The present invention pertains to a plumb bob device for determining the bed height of a bulk material in a shaft furnace with a hydraulic drive of a winding drum arranged in a gas-tight housing for unwinding and rewinding a cable or a chain with a plumb bob arranged at its end, and with a displacement transducer driven by the winding drum shaft.

BACKGROUND OF THE INVENTION

It is known that the bed height of a bulk material in a shaft furnace can be monitored with mechanical depth-measuring probes. This is carried out such that a plumb bob suspended on a cable or a chain is lowered from the top onto the surface of the bed of bulk material in the shaft furnace by means of a winding drum. The cable is now unwound from the drum, to the shaft of which a displacement transducer is connected. The displacement transducer measures the angle of rotation of the winding drum, from which the depth of lowering of the plumb bob is obtained.

To determine the exact depth, it is necessary for the plumb bob cable on the winding drum to be maintained taut at all times, so that the plumb bob will be in the upright position, thus touching accurately the surface of the column of bulk material in the shaft furnace. Tilting or laying the plumb bob flat would lead to incorrect readings. Furthermore, the velocity of lowering must not increase with increasing depth, and the resulting increase in the cable weight must not be great enough to enable the plumb bob to penetrate into the bed of bulk material in the shaft furnace.

The plumb bob must always remain on the surface of the bed of bulk material while the bed height decreases, i.e., it must uniformly follow the sinking burden column. The plumb bob must not lose its contact with the burden column under any circumstances. Only this can guarantee continuous and accurate measurement of the filling level in the shaft furnace.

Burying of the plumb bob in the burden column cannot be fully ruled out during irregular furnace operation. Therefore, measuring devices according to the state of the art generally provide for a mode of operation in which the plumb bob is raised by an amount of, e g., 1 m at time intervals of 10 to 20 sec, and subsequently lowered immediately again onto the bed of bulk material.

Electric motors or high-speed hydraulic motors which drive the winding drum of the plumb bob device via a reducing gear are known as the drive for measuring devices according to the state of the art.

It proved to be a disadvantage of the prior-art depth-measuring devices that the accuracy of measurement is jeopardized by the fact that the change in weight caused by the increasing cable weight with increasing depth (sinking of the burden column) is taken into account only inaccurately. In addition, the different friction resistances during the reversal of the direction of rotation of the winding drum (downward and upward movement of the plumb bob hanging on the cable) are not taken into account in the prior-art devices. Despite the considerable control efforts applied, the plumb bob can be held in the upright position in contact with the bed of bulk material only imperfectly.

SUMMARY AND OBJECTS OF THE INVENTION

It is an object of the present invention to improve plumb bob devices of the above-described class such that the aforementioned disadvantages are avoided and a motor-driven plumb bob device is thus available, by which measurement of the bed of bulk material in the shaft furnace is made possible with the highest accuracy, the mechanical friction resistances are minimized, and the increase in the cable weight or the chain weight with increasing depth, i.e., sinking burden column, is taken strictly into account.

The objects of the invention are achieved by providing a plumb bob device for determining the bed height of a bulk material in a shaft furnace with a hydraulic drive of a winding drum arranged in a gas-type housing for unwinding and rewinding a cable or a chain with a plumb bob arranged at its end. A displacement transducer is provided driven by the winding drum shaft. The driving drum is driven without intercalation of a reducing gear by a low-speed hydraulic motor. A signal associated with the actual depth is sent by the displacement transducer directly, i.e. without an electrical control device to a pressure-proportional valve. The pressure-proportional valve presets a plumb bob holding pressure associated with the actual depth for the hydraulic motor. The plumb bob may be raised from the measuring position from a length determined at time intervals to be determined using a directional control valve which may used for subsequently again lowering the plumb bob into the measuring position.

In the plumb bob device according to the present invention, the winding drum is driven directly by a low-speed hydraulic motor, i.e., a motor with a speed of up to 50 rpm, without an intermediate reducing gear. This concept minimizes the friction resistances. The displacement transducer driven by the drum shaft sends a signal associated with the actual depth, which directly controls a pressure-proportional valve. The increase in the weight of the cable or chain with increasing depth can thus be taken into account correctly. The hydraulic motor maintains the countertorque corresponding to the actual depth.

A hitherto unknown sensitivity and accuracy of measurement in monitoring the bed height of the bulk material in the shaft furnace can be achieved by means of the device according to the present invention. When the plumb bob is placed on the surface of the burden column, the plumb bob always remains in the upright position, since the low-speed hydraulic motor has very small rotating masses compared with a high-speed drive with a reducing gear, and the low speed hydraulic motor can be decelerated without delay. The weight-holding pressure of the motor is accurately adapted by the pressure-proportional valve to the weight of the plumb bob plus the instantaneous cable weights. Therefore, the plumb bob winch generates exactly the pulling force that is needed to maintain the plumb bob [in the upright position]and ensures lowering of the plumb bob with sinking burden column.

It should be pointed out in particular that the aforementioned sensitivity of the device according to the present invention is reached without the need to operate valves or the like by means of a control device.

If a hydraulic oil storage container and a stand-by battery (for switching the directional control valve) are used in the device according to the present invention, it is possible to maintain the depth measurement over a set period even in the case of possible malfunctions in the electric power supply line.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

The winding drum 1 is connected via a clutch 2 to the hydraulic motor 3, which has an integrated brake 4. The cable 5, on the end of which the plumb bob 6 is suspended, is wound up on the winding drum 1 or is wound off from the winding drum by the hydraulic motor 3, which is able to rotate in both directions. It is, of course, also possible to use a chain instead of a cable.

The pressure to build up the torque to be applied by the hydraulic motor 3 is selected to be so high that the "countertorque" of the hydraulic motor 3 will be slightly below the torque of the winding drum 1 which is produced by the cable system from the weight of the plumb bob 6 plus the cable weight 5. It is thus ensured that the cable 5 is kept taut at all times, and the winding drum 1 will stop immediately, because the plumb bob 6 touches down on the burden, as a result of which the excess torque generated on the winding drum 1 by the weight of the plumb bob 6 plus the cable weight on the winding drum is reduced compared with the torque of the hydraulic motor.

To lower the plumb bob 6 into the shaft furnace, the brake 4 of the hydraulic motor 3 is released via the directional control valve 7. At the same time, to overcome the breakaway torque of the winding drum 1 and the hydraulic motor 3, hydraulic oil is admitted into the hydraulic motor 3 from the hydraulic oil container 16 via the directional control valve 8 in the direction in which the plumb bob will go down. After the winding drum 1 has started rotating, the directional control valve 8 is again switched over into its resting position. Via the displacement transducer 9, the pressure-proportional valve 10 is actuated corresponding to the actual depth such that the torque of the hydraulic motor 3 will be slightly below the torque of the winding drum which is generated by the plumb bob 6 pulling instantaneously in the working direction plus the cable weight 5.

To prevent the plumb bob 6 from tipping over after touchdown, a small amount of hydraulic oil is continuously admitted in front of the pressure- proportional valve 10 from the hydraulic oil circuit via the directional control valve 11 to compensate for losses caused by oil leakage. As a result, the "weight-holding pressure" corresponding to the actual depth i.e., the pressure needed to bring the plumb bob into the upright position is maintained even when the hydraulic motor 3 is not running. The velocity with which the plumb bob 6 is lowered is set on the flow control valve 12, and the amount admitted is set on valve 13. To raise the plumb bob 6, the valve 14 is switched over, so that the direction of rotation of the hydraulic motor 3 will be reversed, as a result of which the winding drum 1 will wind up the cable 5. When the upper resting position parking position is reached, the brake 4 is applied via the directional control valve 7 and the displacement transducer 9, and the directional control valves 11 and 14 are switched over into their resting positions. The directional control valve 11 is therefore switched into its resting position in order to prevent hydraulic oil from being consumed during the intervals between measurements during charging of the furnace. The valve 14 is switched into its resting position in order to make preparations for lowering the plumb bob 6. The velocity with which the plumb bob is raised is set on the flow control valve 15.

When measuring greater depths, the flow control valve 12 can be bypassed by means of a bypass circuit. This makes it possible to move at higher speed in the case of great distances. The velocity is switched over to lowering for measurement purposes shortly before the depth to be measured is reached.

The check valves are designated by reference numeral 17 in the diagram circuit diagram.

While a specific embodiment of the invention has been shown and described in detail to illustrate the application of the principles of the invention, it will be understood that the invention may be embodied otherwise without departing from such principles.

What is claimed is:

1. A plumb bob device for determining the bed height of a bulk material in a shaft furnace comprising:
   a hydraulic drive connected to a winding drum arranged in a gas- tight housing for unwinding and rewinding a cable or chain with a plumb bob arranged at its end; a displacement transducer attached to a shaft of said winding drum for generating a signal associated with the actual depth of the plumb bob; said hydraulic drive including drive means for driving said driving drum without intercalation of a reducing gear and includes a low-speed hydraulic motor; a pressure proportional valve connected to said low-speed hydraulic motor, said pressure proportional valve receiving said signal associated with the actual depth of the plumb bob, directly from the displacement transducer without an electrical control device, for actuating said pressure proportional valve to maintain the torque of the hydraulic motor slightly below a torque of the winding drum, said pressure proportional valve presetting a plumb bob holding pressure associated with the actual depth of the plumb bob, for the hydraulic motor.

2. A plumb bob device according to claim 1, wherein said plumb bob is raised from a measuring position by a length and at time intervals, and is subsequently again lowered into the measuring position by directional control valve means for controlling said raising and said lowering.

* * * * *